United States Patent

Ogimoto et al.

[11] Patent Number: 6,010,777
[45] Date of Patent: Jan. 4, 2000

[54] TITANIUM CARBO-NITRIDE COMPLEX SILICON NITRIDE TOOL

[75] Inventors: Shinya Ogimoto; Masaru Matsubara; Hideki Kato; Yasuhiro Ninomiya, all of Aichi; Kazuhiro Shintani, Ishikawa, all of Japan

[73] Assignee: NGK Spark Plug Co., Ltd., Aichi, Japan

[21] Appl. No.: 08/856,164

[22] Filed: May 14, 1997

[30] Foreign Application Priority Data

Jan. 31, 1997 [JP] Japan .................................. 9-033181

[51] Int. Cl.$^7$ .................................................. C04B 35/58
[52] U.S. Cl. ............................ 428/325; 51/307; 51/309; 156/89; 264/668; 264/683; 428/323; 428/336; 428/698; 428/697; 501/96.1; 501/97.1; 501/97.2
[58] Field of Search ...................... 428/698, 697, 428/699, 336, 323, 325; 501/96.1, 97.1, 97.2; 51/307, 309

[56] References Cited

U.S. PATENT DOCUMENTS

| | | | |
|---|---|---|---|
| 4,406,667 | 9/1983 | Sarin et al. | 428/698 |
| 4,416,670 | 11/1983 | Sarin et al. | 428/698 |
| 4,632,910 | 12/1986 | Lee et al. | |
| 4,745,022 | 5/1988 | Miyake et al. | 428/698 |
| 5,093,290 | 3/1992 | Funikawa et al. | 501/97 |
| 5,250,477 | 10/1993 | Baldoni, II et al. | 407/119 |
| 5,296,008 | 3/1994 | Moriguchi et al. | 51/295 |

FOREIGN PATENT DOCUMENTS

| | | |
|---|---|---|
| 0 592 871 | 4/1994 | European Pat. Off. . |
| 58-95662 | 6/1983 | Japan . |
| 61-10416 | 1/1986 | Japan . |
| 61-17473 | 1/1986 | Japan . |
| 61-31358 | 2/1986 | Japan . |
| 5-7122 | 1/1993 | Japan . |

OTHER PUBLICATIONS

Database WPI Week 8610, Derwent Publications Ltd., London, GB AN 86–065674 XP002083031 & JP 61 017473, Jan. 25, 1986, abstract.

Database WPI Week 8120, Derwent Publications Ltd., London, GB AN 81–35376D XP002083032 & JP 56 032377, Apr. 1, 1981, abstract.

*Primary Examiner*—Archene Turner
*Attorney, Agent, or Firm*—Morrison & Foerster LLP

[57] ABSTRACT

Titanium carbo-nitride complex silicon nitride tool is composed mainly of titanium carbo-nitride and silicon nitride and contains 10 to 56 wt % of Ti, 11.6 to 51 wt % of Si and 1 to 21 wt % in total of one or two or more of Ce, Y, Yb and Dy. The tool is mainly composed of $Si_3N_4$ superior in both strength and resistance against thermal shock and TiCN superior in the effect of suppressing reactivity of $Si_3N_4$ with Fe and exhibiting high hardness. By using oxides $CeO_2$, $Y_2O_3$, $Yb_2O_3$ and $Dy_2O_3$ as sintering aid so that the sum of the amounts of Ce, Y, Yb and Dy will be in the above range, both the resistance against flank notch (wear) of the end edge and resistance against thermal shock are improved resulting in improved durability as compared to the conventional silicon nitride cutting tool.

25 Claims, 4 Drawing Sheets

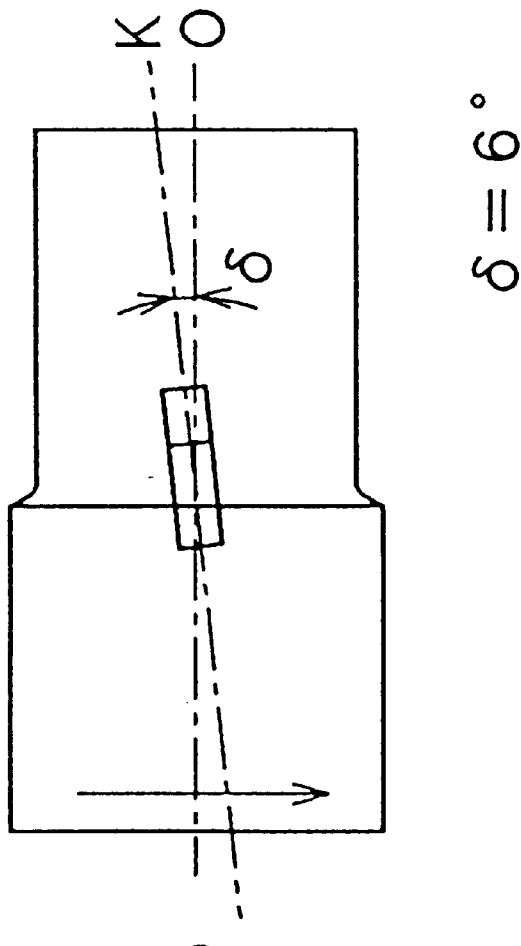
FIG. 3 (B) LEFT SIDE VIEW
FIG. 3 (C) FRONT VIEW
$\delta = 6°$

TITANIUM CARBO-NITRIDE COMPLEX SILICON NITRIDE TOOL

FIELD OF THE INVENTION

This invention relates to a titanium carbo-nitride complex silicon nitride tool or generally ceramic and, more particularly, to a titanium carbo-nitride complex silicon nitride tool superior in wear resistance, resistance against thermal shock and high-speed machining performance for a workpiece such as cast iron or inconel. The present invention further relates to a method for producing same.

BACKGROUND

RELATED ART

Recently, a silicon nitride based cutting tool, having superior mechanical strength and resistance against thermal shock, has come into use as a tool for cutting cast iron. On the other hand, under more stringent cutting conditions, such as high-speed wet machining with a cutting speed exceeding 800 m/min, sufficient resistance against thermal impact or wear resistance cannot be sufficiently assured even with the use of the silicon nitride based cutting tool. In such case, the CBN cutting tool is used. However, the CBN cutting tool, manufactured in general using an ultra high pressure sintering method, is much more costly than the silicon nitride based cutting tool. Thus, various proposals have been made for a silicon nitride based cutting tool for obtaining a tool more inexpensive and more suitable for high-speed machining of cast iron.

In the JP Patent Kokai JP-A-58-95662 and JP Patent Kokoku JP-B-5-7122, there is disclosed a tool in which TiN is compounded as a hard dispersed phase in silicon nitride ($Si_3N_4$) to suppress the chemical reaction between silicon nitride and Fe at elevated temperatures. In JP Patent Kokoku JP-B-61-10416 and JP Patent Kokai JP-A-61-17473, there is proposed a tool in which titanium nitride, titanium carbide or titanium carbo-nitride is compounded as a hard dispersed phase into silicon nitride for improving wear resistance. On the other hand, in JP Patent Kokai JP-A-61-31558, there is proposed a tool in which, for suppressing generation of silicon carbide or titanium nitride due to chemical reaction of titanium carbide with silicon nitride and for suppressing generation of $N_2$ gas, the titanium carbide particle surface is coated with titanium nitride and compounded as a hard dispersed phase with silicon nitride.

SUMMARY OF THE DISCLOSURE

The silicon nitride machining tool disclosed in the above Patent Publications are produced by adding oxides, such as $Al_2O_3$, MgO, $SiO_2$ etc. as sintering aids and by firing at a temperature or a pressure which does not decompose silicon nitride. The reason is that, if silicon nitride is compounded with carbides, nitrides or carbo-nitrides of titanium, sinterability is lowered with increased amounts thereof.

However, according to the investigation toward the present invention the following problem has turned out. Namely, the oxides used as sintering aids in the prior art, such as $Al_2O_3$, MgO, $SiO_2$ etc., are reacted with each other or with $SiO_2$ left on the surface of the silicon nitride surface phase, during firing to form a low melting glass phase, thus lowering the resistance against wear of the tool edge which is heated to high temperature during high-speed cutting, in particular, the resistance against flank notch (wear) of the end cutting edge.

Therefore, it is an object of the present invention to provide a titanium carbo-nitride complex silicon nitride tool, or generally complex silicon nitride ceramic which is superior in resistance against wear, in particular in both the resistance against frank notch (wear) on the end cutting edge and resistance against thermal shock and which is suited to high-speed machining of cast iron or the like.

Further object will become apparent in the entire disclosure.

According to a first aspect of the present invention, there is provide d a titanium carbo-nitride complex silicon nitride tool (or ceramic)(referred to hereinafter simply as "tool") according to the present invention is composed mainly of titanium carbo-nitride and silicon nitride and contains 10 to 56 wt % of Ti, 11.6 to 51 wt % of Si and 1 to 21 wt % in total of one or two or more of Ce, Y, Yb and Dy. In the present specification, titanium carbo-nitride means a complex titanium compound composed of in total 1 mol of titanium and carbon and nitrogen summed together (chemical formula: $TiC_xN_{1-x}$, where x>0).

According to a second aspect of the present invention there is provided a method for producing a titanium carbo-nitride complex silicon nitride tool (or ceramic). The titanium carbo-nitride complex silicon nitride ceramic may be produced by providing a composition composed of 10 to 60 vol. % of titanium carbo-nitride, 0.5 to 10 vol. % of one or more selected from the group of $CeO_2$, $Y_2O_3$, $Yb_2O_3$ and $Dy_2O_3$ and the balance being silicon nitride, and sintering the composition to a pre-determined shape, particularly tool shape. In this case, the Ce, Y, Yb and Dy components are derived from the components of the sintering aids. The oxygen content in the tool (or ceramic) then is 0.14 to 3.5 wt %.

The above tool (or ceramic) is mainly composed of silicon nitride superior in both strength and in resistance against thermal shock and titanium carbo-nitride having high hardness and superior in the effect of suppressing reactivity of silicon nitride and Fe. In addition, by using oxides, namely $CeO_2$, $Y_2O_3$, $Yb_2O_3$ and $Dy_2O_3$, as sintering aid components, so that the amounts of Ce, Y, Yb and Dy in the tool will be in the above range, the resistance against wear, in particular the resistance against boundary wear of the end cutting edge and resistance against thermal shock, is improved resulting in improved service life of the tool as compared to the conventional silicon nitride cutting tool. Thus the tool may be applied to wet high speed machining of, for example, cast iron, thus significantly lowering the tool cost and hence the cost of the cutting tool, for which, hitherto only CBN sintered at super high pressure has been used.

DESCRIPTION OF THE PREFERRED EMBODIMENTS

Figure 1:
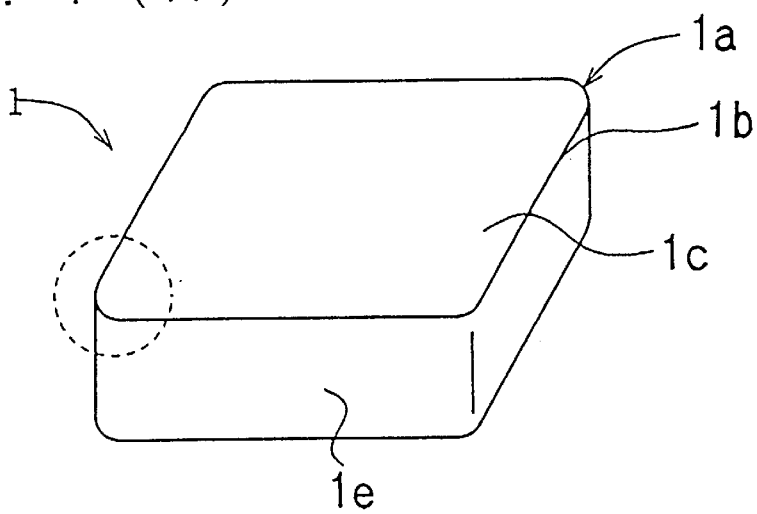
FIG. 1 is a perspective view, a partial schematic cross-sectional side view and a partial enlarged perspective view of a test piece for evaluating the cutting performance employed in the Examples.
Figure 1:
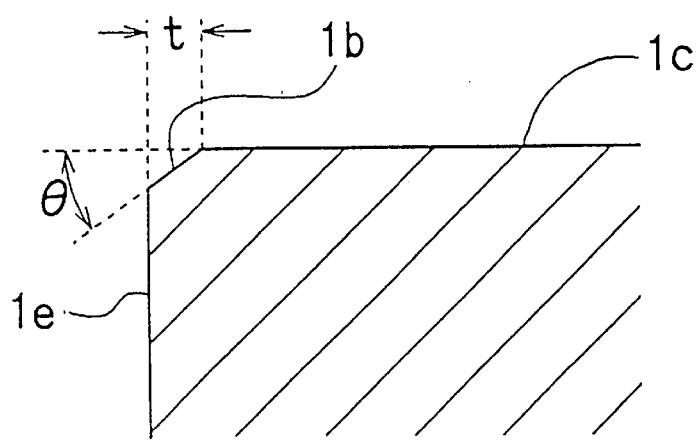
Figure 1:
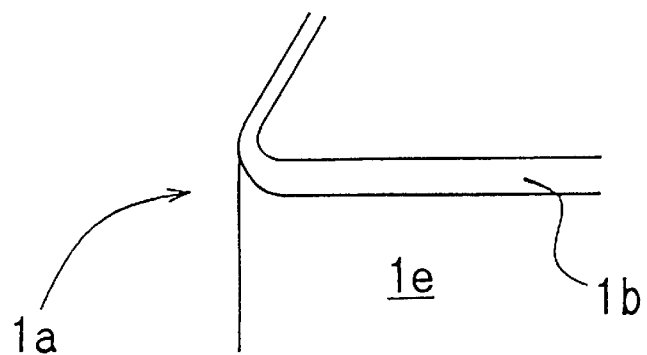

The tool (or ceramic) is thought to be improved in resistance against wear by the following reason. That is, $CeO_2$, $Y_2O_3$, $Yb_2O_3$ and $Dy_2O_3$ used as sintering aid components have higher melting points than $Al_2O_3$, MgO or $SiO_2$, conventionally used, so that reaction between the sintering aid components and reaction of these components with $SiO_2$ remaining on the surface of the silicon nitride phase during sintering can be suppressed to render it difficult to generate a glass phase melting at a low temperature. The result is that, if the tool or ceramic is used as a cutting tool, the cutting edge can hardly be softened even under elevated temperatures such that high hardness can be maintained up to elevated temperatures. Specifically, the above composition setting leads to a high strength tool (or ceramic) having a Vickers hardness at room temperature 160 GPa or more and a bending strength at 1000° C. of not less than 800 MPa. By assuring the Vickers hardness at room temperature exceeding 160 GPa and a bending strength at 1000° C. of not less than 800 MPa, sufficient resistance against wear and resistance against chipping can be assured even if, in machining cast iron parts, intermittent machining is carried out under the presence of holes or steps.

The Vickers hardness means the hardness as measured in accordance with the prescriptions of JISR1610. The Vickers hardness is defined as the impression area divided by the load, and is of the same dimension as the force per unit surface area such as pressure. In the present specification, the Vickers hardness is defined as the value for the indentation area in $m^2$ and the load in N (Newton), with the resultant unit being in Pascal (Pa) as a SI unit. The bending strength in the present specification means a value as measured based on a three-point bending test method as prescribed in JISR1604 (high temperature bending strength testing method for fine ceramics).

On the other hand, the value of the fracture toughness of a tool is preferably not less than 4.0 $MPa.m^{1/2}$ as measured by the indentation fracture (IF) method among the fracture toughness testing methods stated in JIS-R1607 (1990). If the value of the fracture toughness is less than 4.0 $MPa.m^{1/2}$, there are occasions wherein sufficient resistance against chipping as a tool cannot be assured. The value of the fracture toughness is preferably not less than 5.0 $MPa.m^{1/2}$.

The essential meaning of the ranges of the respective components will be now explained.
(i) Amounts of Ce, Y, Yb and Dy If Ce, Y, Yb and Dy are added as oxides, and if the total amount of Ce, Y, Yb and Dy exceeds 21 wt %, the amount of the glass phase is increased leading to insufficient machining performance, in particular to insufficient wear resistance of the tool. If this total amount is less than 1 wt %, sinterability is lowered thus again leading to lowered tool performance. The above total amount is preferably adjusted within a range of from 3 to 15 wt %. Although only one sort of the oxides suffices, two or more different oxides may be used in combination for further improving sinterability for obtaining a tool which is dense and superior in strength and wear resistance. Specifically, each 1 wt % or more of two of Ce, Y, Yb and Dy is added and, more specifically, the amounts are preferably adjusted so that, if the amount of one of the two elements is X wt % and that of the other element is Y wt %, X+Y exceeds 3 wt % and X/(X+Y) is in a range from 0.35 to 0.65.
(ii) Amounts of Ti and Si If the amount of Ti is less than 10 wt % or the amount of Si exceeds 51 wt %, improved hardness or improved wear resistance, among the effects of addition of titanium carbo-nitride, cannot be achieved sufficiently. Conversely, should the Ti amount exceed 56 wt % or should the Si amount fall below 11.6 wt %, the relative amount of silicon nitride is lowered resulting in loss of toughness. Moreover, sinterability is lowered thus leading to lowered wear resistance. Therefore, the amounts of Ti and Si are preferably set to 10 to 56 wt % and to 11.6 to 51 wt %, respectively. Preferably, the amounts of Ti and Si are set to 19 to 41 wt % and to 21 to 42.8 wt %, respectively. This further improves sinterability such that it becomes possible to realize a tool of high hardness and high strength having the Vickers hardness at room temperature of not less than 17 GPa and the bending strength at 1000° C. of not less than 850 MPa. If a tool with a higher hardness is required, it is preferred to set Ti and Si to the ranges of from 41 to 56 wt % and from 11.8 to 28.8 wt %, respectively. This renders it possible to assure a Vickers hardness of not less than 18 GPa.

The sum of the amounts of Ti and Si is preferably not lower than 48.5 wt %. If the total amount is less than 48.5 wt %, the relative amount of the sintering aid components becomes excessive to generate superfluous glass phases thus lowering wear resistance and hence machinability. Meanwhile, the total amount is more preferably not less than 51 wt %.

On the other hand, the mole amounts KC and KN of C and N in titanium carbo-nitride are preferably set so that, assuming that Si in its entirety is a component of silicon nitride, C and Ti are all constituents of titanium carbo-nitride and N in its entirety is the constituent of silicon nitride and titanium carbo-nitride, the value of KN/(KC+KN) calculated on the basis of the molar amounts of Ti, Si, C and N in the tool and the above assumption is 0.5 to 0.7, that is so as to be slightly N-rich. If KN/(KC+KN) is less than 0.5, that is if the composition is C-rich, free carbon tends to be produced during sintering, such that sinterability tends to be lowered under the effect of the resulting CO gas. On the other hand, if KN/(KC+KN) exceeds 0.7, titanium carbo-nitride is lowered in hardness and increased in linear expansion coefficient, such that, if the amount of titanium carbo-nitride is increased, there would be certain occasions where the tool may be affected adversely in machining performance.

If the molar amounts of Si, Ti, C and N determined by, for example, analytic methods, are denoted by NSi, NTi, NC and NN, respectively, the molar amount PN of N ascribed to silicon nitride is $$PN=(4/3) \times NSi \quad (1)$$

whereas, if it is assumed that residual N is ascribed to carbon titanium oxide, the molar mount QN of the ascribed to N is given by $$QN-NN-PN=NN-(4/3) \times NSi \quad (2)$$

On the other hand, since C is supposed to be ascribed in its entirety to titanium carbo-nitride, the amount of of C ascribed to titanium carbo-nitride QC is given by $$QC=NC \quad (3)$$

Therefore, KN/(KC+KN) can be calculated as $$KN/(KC+KN)=QN/(QC+QN)=\{NN-(4/3) \times NSi\}/\{NC+NN-(4/3) \times NSi\} \quad (4)$$

From the compositional formula of titanium carbo-nitride, the amount of titanium is equal to the total amount of carbon and nitrogen combined with titanium. Therefore, the amount of C ascribed to titanium carbo-nitride QC can be-represented, with the use of the molar amount of titanium NTi, by $$QC = NTi - QN \quad (5)$$

From (2), (4) and (5), $$KN/(KC+KN) = \{NN-(4/3) \times NSi\}/NTi \quad (6)$$

such that KN/(KC+KN) can be calculated without employing NC.

The amounts of Ce, Y, Yb, Dy, Ti and Si can be determined by, for example, X-ray fluorescence analysis, ICP analysis or by chemical analysis.

For producing the above tool, the hot-press method may be used. The atmosphere for hot-press is preferably an inert gas, such as $N_2$ or Ar of 0.1 to 0.98 MPa (1 to 9.8 atm), preferably 0.3 MPa or more. The atmosphere of $N_2$ is more desirable for suppressing decomposition of silicon nitride during sintering. Preferably, the pressing force is 20 to 30 MPa (200 to 300 kg/cm$^2$), with the sintering temperature being preferably 1850 to 1900° C.

The complex ceramic or cutting tool according to the present invention may be typically produced by the following method. The method comprises (a) preparing a starting material mix, and (b) sintering the resulting mix (with simultaneous and/or preliminary forming). The starting material mix is prepared by mixing 10 to 60 vol % of TiCN power, not more than 10 vol % of at least one selected from the powders of $Ce_2O_2$, $Y_2O_3$, $Yb_2O_3$ and $Dy_2O_3$, and the balance being $Si_3N_3$ powder. The sintering may be done either hot pressing (HP) or hot isostatic pressing (HIP). The HP sintering may be carried out typically at 1850 to 1900° C. in a pressurized nitrogen atmosphere typically of 0.3 to 0.98 MPa (3 to 9.8 atm), under application of uniaxial force, preferably of 20 to 30 MPa (200 to 300 kg/cm$^2$). For instance, with a composition with a TiCN amount of 30 vol % or less, HIP method is also preferred in which the starting powder mix is press-molded and subjected to preliminary sintering which is preferably carried out under the conditions of a temperature up to 1750° C. in a nitrogen gas atmosphere, e.g., of 0.1 MPa (1 atm), for e.g., about 2 hours, achieving a prerequisite density (e.g., about 95%) followed by HIP sintering, preferably, in nitrogen gas of a very high pressure, e.g., at a temperature ranging from 100 to 150 MPa (1000 to 1500 atm) at 1500 to 1700° C.

TiCN acts as a dispersed hard phase in the sintered body. In this regard, TiN or TiC acts similarly, TiCN is specifically selected in the present invention considering hardness, chemical stability, cost etc. The starting TiCN is determined to be $TiC_xN_{1-x}$ (0.3<x<0.5) so as to be slightly N-rich such that KN/(KC+KN) ratio in the TiCN present in the sintered body is set to 0.5 to 0.7. This is because, if a C-rich starting composition, e.g., of $TiC_xN_{1-x}$ (x=0.8) is used, the sinterability is lowered by presence of free carbon which is converted into CO gas during the sintering. On the other hand if an N-rich composition is selected, such preblem can be suppressed. At an amount of TiCN less than 10 vol % in the starting composition, the hardness and wear resistance ascribed to the presence of TiCN cannot be improved. On the other hand if TiCN will exceed 60 vol %, it tends to become a composition of a relatively small amount of silicon nitride resulting in reduced toughness. Thus the amount of TiCN should be 10 to 60 vol %. A preferred amount of TiCN is 20 to 40 vol % considering the sintering ease and improvement of the wear resistance, while 40 to 60 vol % is preferred considering only the wear resistance.

At least one oxide selected from $CeO_2$, $Y_2O_3$, $Yb_2O_3$ and $Dy_2O_3$ act as a sintering aid, firmly bonding TiCN grains and silicon nitride grains to each other. However, these oxides yeilds a glass phase having a higher melting point than those of glass phases resulting from $Al_2O_3$, MgO, $SiO_2$ etc., even if a glass phase is yielded. Therefore, this leads to an excellent wear resistance.

Any of these sintering aids may be used alone, however, preferably in combination of two or more. An excess amount of the sintering aids will result in an excess amount of the glass phase, entailing a reduced cutting performance, particularly wear resistance, although an enhanced sinterability is obtained. Thus it is preferred to use the sintering aids in an amount of 10 vol % or less. Also the sintering aids should be present at least 0.5 vol %, preferably 1.0 vol % or more or 6.0 vol % or less.

The hot isostatic pressing (HIP) method may be used in place of the hot pressing method. The conditions of HIP processing preferably include a processing temperature not higher than 1750° C. and a pressure of not lower than 90 MPa (900 atm). If the processing temperature exceeds 1750° C., crystal grain growth proceeds excessively during processing, so that the necessary strength tends to be hardly achieved. Conversely, with the pressure less than 90 MPa (900 atm), the material tends to be insufficient in denseness thus leading to insufficient strength. As for the pressure, a pressure of the order of 200 MPa (2000 atm) is thought to be an upper limit with a commonly used HIP device, if durability of the device is taken into account. However, a higher pressure may be set if the problem of durability of the device is not presented. More preferably, the processing temperature is set to 1500 to 1700° C. More preferably, the pressure is set to 100 MPa (1000 atm) or higher. By preliminarily molding starting powders, preliminarily sintering the molded powders at a temperature of 1550 to 1800° C. and working the sintered product by HIP, a sintered article of a desired shape can be produced efficiently. If, with a preliminary sintering atmosphere being the $N_2$ atmosphere of 0.1 MPa (1 atm), the preliminary sintering temperature becomes lower than 1550° C., open pores are left in the preliminary molded article, occasionally leading to an insufficient effect in contracting the product by subsequent HIP processing. Conversely, with a preliminary sintering temperature exceeding 1800° C., silicon nitride tends to be decomposed to occasionally lead to an insufficient material strength. However, with the use of the preliminary sintering atmosphere at a pressure higher than 1 atm, for instance, $N_2$ atmosphere at 0.2 to 1 MPa (2 to 10 atm), silicon nitride is less liable to be decomposed, so that it becomes occasionally possible to raise the preliminary sintering temperature to not lower than 1800° C., for instance, to approximately 1850° C., for instance, to approximately 2000° C.

The above-described tool of the present invention may have its surface coated with a coating layer mainly composed of a solid solution of one or two or more of a carbide, a nitride, carbon nitride and oxide of Al and a carbide, a nitride, carbon nitride and oxide of Al of Ti, wherein the particle size of constituent particles is not more than 0.5 μm and wherein the coating layer has a film thickness of 1 to 5 μm. This has such an effect that, if the reaction between silicon nitride and Fe in a workpiece during high-speed machining poses a problem, such reaction can be suppressed by the coating to prevent the workpiece surface from being roughened or to prolong service life of the tool.

Illustrative examples of the coating layer include $Al_2O_3$, TiC, TiN and TiAlN. Of these, the coating layer of $Al_2O_3$ is effective in improving resistance against oxidation, while that of TiC is effective in enhancing the wear resistance due to an increased hardness. TiN is effective in lowering the frictional coefficient and hence in decreasing the machining resistance and in improving the appearance and color. The coating layer of TiAlN, similarly to TiC, is effective in improving wear resistance. Any known coating methods, such as various PVD or CVD methods, may be used for coating.

The grain size of constituent(crystal) grains of the coating layer is preferably not larger than 0.5 μm. By setting the grain size of the coating layer to this range, not only the coating surface becomes smooth and the coating layer is improved in durability, but also is the finished surface of the processed workpiece improved. If the grain size exceeds 0.5 μm, it is likely that grains be detached from the coating surface thus possibly leading to chipping or peeling. The processed workpiece surface tends to be roughened such that satisfactory machining performance can occasionally not be achieved. For producing a coating layer with the small grain size as described above, the methods of lowering the coating temperature, shortening the coating time or adjusting the atmosphere, may be employed.

The film thickness of the coating layer is preferably 1 to 5 μm. With a film thickness less than 1 μm, the function as the coating layer cannot be fulfilled, such that the tool service life cannot be improved sufficiently. With a film thickness exceeding 5 μm, the stress in the coating layer is increased, such that the coating layer tends to be peeled off during machining. More preferably, the film thickness of the coating layer is set to a range of 2 to 5 μm.

The coating layer may also be formed as plural layers. In this case, the total film thickness is set to a range of 1 to 5 μm and preferably to a range of 2 to 5 μm. In this case, the types of the materials and properties of respective layers may differ from one another.

EXAMPLES

Example 1

As the starting material, $\alpha$-$Si_3N_4$ powders with a mean particle size of 0.7 μm, powders of titanium carbo-nitride with a mean particle size of 1.2 μm (KN/(KC+KN)=0.5), and powders of sintering aids (powders of $Yb_2O_3$ with a mean particle size of 1.5 μm, powders of $CeO_2$ with a mean particle size of 1.0 μm, powders of $Y_2O_3$ with a mean particle size of 1.5 μm and powders of $Dy_2O_3$ with a mean particle size of 1.5 μm) were used. These powders were weighed out to give a predetermined composition ratio and charged into a silicon nitride pot along with balls of silicon nitride (12 mm in diameter) and ethanol, and subjected to mixing and pulverization for 24 hours by a ball mill method. The resulting slurry was charged into a vacuum drier and, after evacuation, heated to a temperature of 70° to 80° C. for drying the powders. The dried powder mix was sieved through a #60 sieve. For comparison, a powder mix using $Al_2O_3$ as a sintering aid was prepared. The corresponding sample is shown as Comparative Example 6 of table 5.

The mixed powders were sintered to a pre-set shape using a hot-press method. The hot-press method was carried out under the following conditions: First, BN powders diluted with ethanol were applied, as a mold release agent, on the surface of a carbon mold. A pre-set amount of the powders were then charged into the mold which was then set in an induction heating furnace. The powders were placed in an $N_2$ atmosphere at 0.98 MPa (9.8 atm) and uniaxially pressed under a pressure of 20 MPa (200 kg/cm$^2$). The powders were simultaneously heated to 1800 to 1900° C. for molding and sintering simultaneously. The density of sintered products thus produced was measured by the Archimedes method. The sintered products were all dense in structure with a density being not lower than 99.5% of the theoretical density. The compositions of the sintered products were analyzed by the X-ray fluorescence analysis.

From each sintered product, a test piece shaped as prescribed in JISR1601 was cut out as a test piece for measuring the physical properties as now explained and was worked by grinding. The test pieces for evaluating the cutting performance were produced by grinding the sintered product to a tool shape, shown in FIG. 1, as prescribed in JIS B4103 as SNGN120408, with a chamfer of 0.1×25°. Specifically, a test piece 1 for evaluation of the cutting performance was flat and prism-shaped with a substantially square cross-section with each side of approximately 12.7 mm, with an R at a corner 1a being approximately 0.8 mm. The chamfer at an edge 1b was designed so that a width t on a main face 1c is approximately 0.1 mm and an inclination angle θ relative to the main face 1c of approximately 25° as shown in FIG. 1b.

First, as physical properties, value of fracture toughness (Kc), Vickers hardness and bending strength were measured. The fracture toughness (Kc) was measured in accordance with the IF method prescribed in JIS R1607, with a Vickers indenting point (diamond pyramid) load of 300 N (30 kgf) and the pressing time of 15 seconds. The value of the Vickers hardness was also measured based on the area of the impression and the load. The value of bending strength was measured by three-point bending by the method provided in JISR1604, as described above, with a test piece installed in a heating furnace heated to 1000° C.

Figure 2:
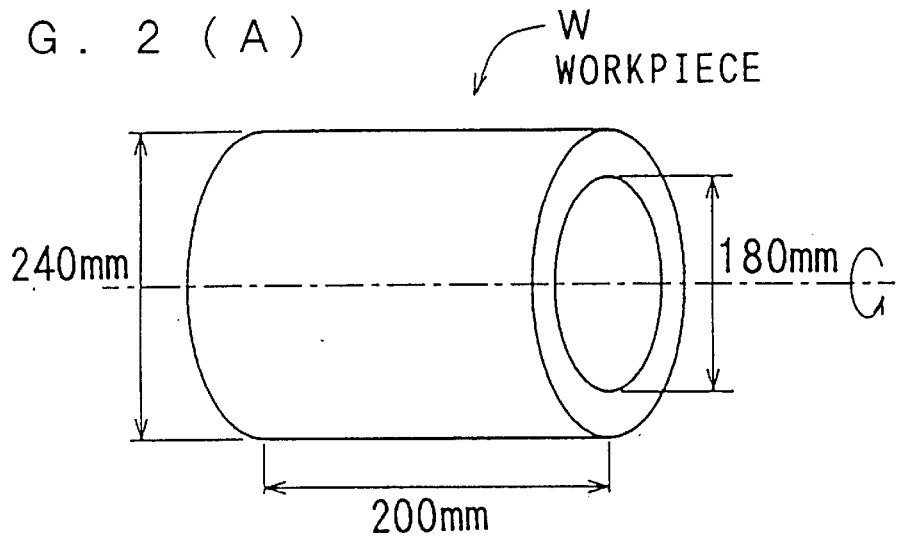
FIG. 2 is an explanatory view showing schematics of a cutting test.
Figure 2:
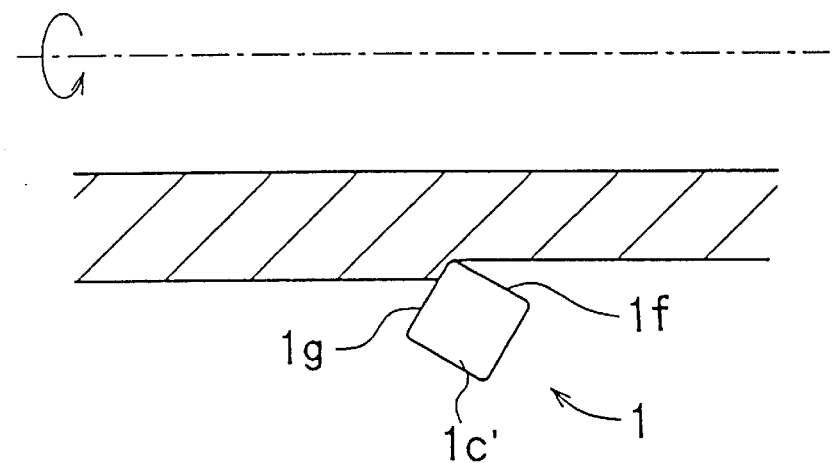
Figure 2:
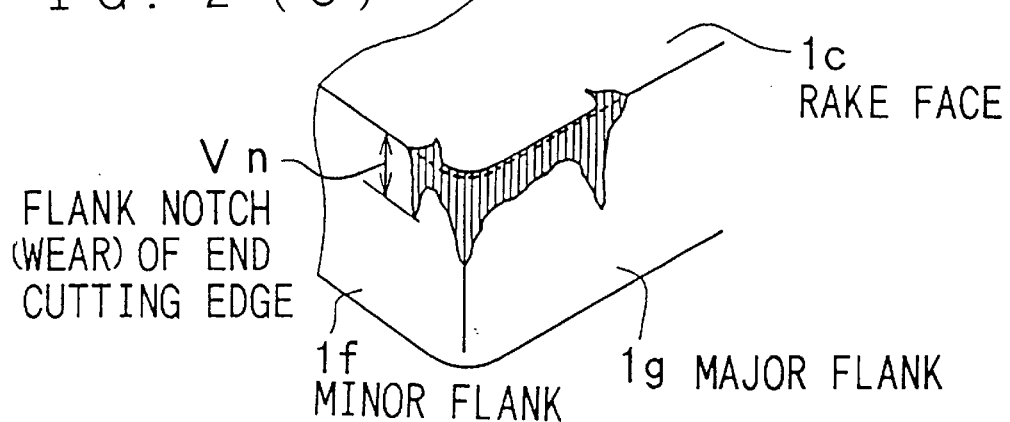
Figure 3:
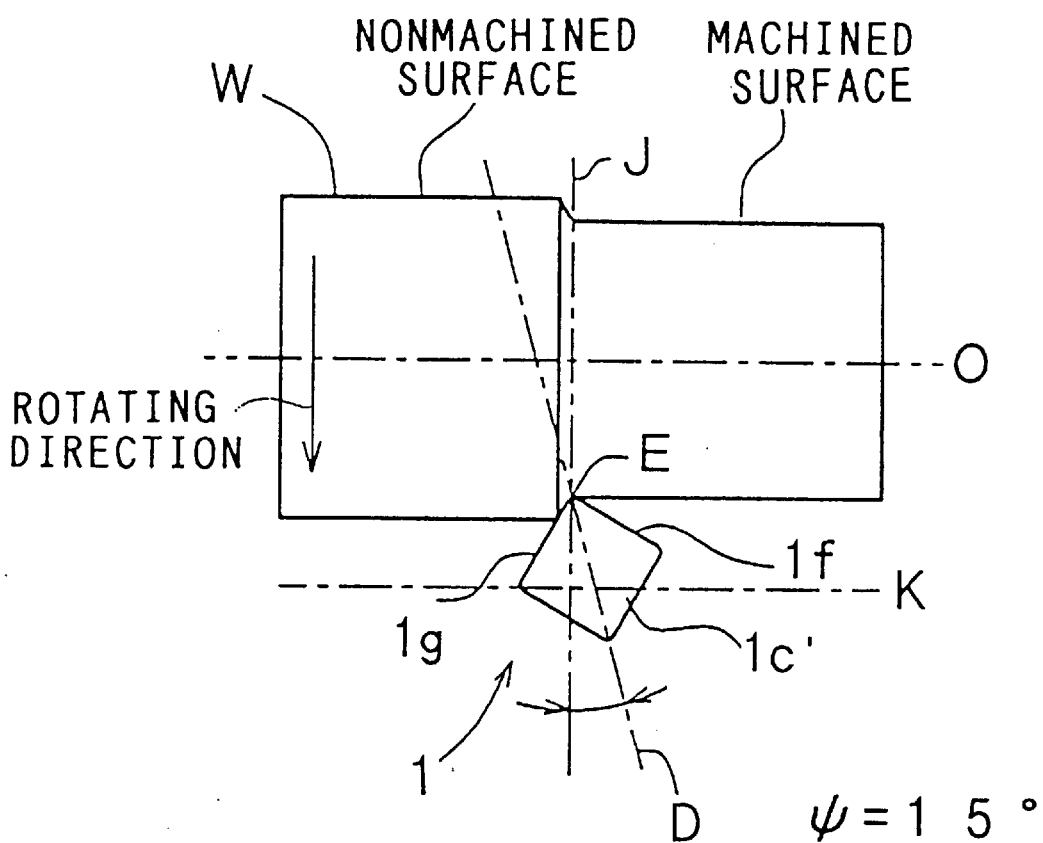
FIG. 3 is an explanatory view showing the relative position between the test piece and the workpiece in a cutting test.

The cutting performance was evaluated under the following conditions: That is, a cylindrically-shaped workpiece W shown in FIG. 2a was rotated about its own axis. On the outer peripheral surface of the workpiece W, a test piece 1, shown in FIG. 1, was abutted as shown in FIG. 2b. Using one of the main faces 1c and the lateral surface 1e as a rake face 1c' and as a flank, respectively, the outer peripheral face of the workpiece was continuously machined under conditions given below. Meanwhile, the detailed positional relation between the test piece 1 and the workpiece is shown in FIG. 3. In this figure, 1g and 1f denote a major (side) flank and an major (end) flank, respectively. The meaning of the remaining reference letters are as follows:

O: center axis of workpiece

D: line parallel to a diagonal of main face 1c' intersecting O=center of workpiece as to its thickness E: intersection between D and periphery of workpiece (cutting point by test piece)

J: line at right angles with O intersecting E

K: line parallel to the other diagonal of main face 1c' intersecting center of workpiece as to its thickness ψ: angle between J and D δ: tilt angle of K against O workpiece: cast iron (JIS FC300 (Vickers hardness: Hv=2.2 GPa))

workpiece shape: outer diameter, 240 mm; inner diameter, 180 mm; length, 200 mm cutting speed V: 600 m/min5 feed f: 0.1 mm/revolution depth of cut d: 0.2 mm cutting oil: water-soluble cutting oil type 1 No. 1 Z (provided in JISK2241 (1986); or an oil (coolant) containing not less than 90% of emulsified non-volatile components, with a pH of 8.5 to 10.5; the non-volatile components containing 0 to 30 wt % of fatty acid, 50 to 80 wt % of mineral oil and 15 to 35 wt % of surfactants).

After termination of cutting, the amount of flank notch (wear) on the end cutting edge of the cutting edge of the tool Vn (maximum height of wear in the turning direction in the vicinity of the boundary with the non-worn area on the minor (end) flank surface 1f; see FIG. 2c) was measured. The service life of the tool was judged by the cutting length until the amount of flank notch of the end cutting edge Vn reaches 0.1 mm. The results are shown in Tables 1 to 5.

TABLE 1

| Example No. | Ti (wt %) | Ce (wt %) | Y (wt %) | Yb (wt %) | Dy (wt %) | Si (wt %) | Kc (MPa · m½) | Hv (GPa) | σ1000° C. (MPa) | cutting length (km) |
|---|---|---|---|---|---|---|---|---|---|---|
| 1  | 11 | 2.4 | —   | 7.7 | —   | 44.6 | 6.5 | 16.1 | 1050 | 15 |
| 2  | 17 | 7.9 | —   | —   | —   | 41.6 | 6.7 | 16.1 | 1040 | 17 |
| 3  | 17 | —   | 5.3 | —   | —   | 43.0 | 6.6 | 16.2 | 1050 | 18 |
| 4  | 16 | —   | —   | 11  | —   | 40.5 | 6.3 | 16.2 | 1040 | 17 |
| 5  | 16 | —   | —   | —   | 9.6 | 41.0 | 6.7 | 16.1 | 1030 | 16 |
| 6  | 17 | 2.4 | 3.7 | —   | —   | 42.6 | 6.7 | 16.1 | 1040 | 16 |
| 7  | 16 | 2.3 | —   | 7.5 | —   | 40.9 | 6.3 | 16.2 | 1030 | 18 |
| 8  | 16 | 2.3 | —   | —   | 6.7 | 41.2 | 6.8 | 16.0 | 1020 | 15 |
| 9  | 16 | —   | 1.5 | 7.6 | —   | 41.2 | 7.0 | 16.2 | 1070 | 16 |
| 10 | 17 | —   | 1.6 | —   | 6.8 | 41.6 | 6.7 | 16.1 | 1030 | 15 |
| 11 | 16 | —   | —   | 5.3 | 4.8 | 40.8 | 6.5 | 16.1 | 1030 | 17 |
| 12 | 17 | 2.4 | 1.6 | 4.4 | —   | 41.6 | 6.7 | 16.2 | 1050 | 17 |
| 13 | 17 | 2.4 | 1.6 | —   | 3.9 | 41.8 | 6.6 | 16.0 | 1040 | 16 |
| 14 | 16 | 2.3 | —   | 3.2 | 3.8 | 41.0 | 6.7 | 16.1 | 1030 | 17 |
| 15 | 17 | —   | 1.5 | 3.3 | 3.9 | 41.4 | 6.5 | 16.0 | 1020 | 16 |

TABLE 2

| Example No. | Ti (wt %) | Ce (wt %) | Y (wt %) | Yb (wt %) | Dy (wt %) | Si (wt %) | Kc (MPa · m½) | Hv (GPa) | σ1000° C. (MPa) | cutting length (km) |
|---|---|---|---|---|---|---|---|---|---|---|
| 16 | 17 | 2.0 | 1.3 | 2.7 | 2.4 | 41.5 | 6.5 | 16.1 | 1020 | 16 |
| 17 | 21 | 2.3 | —   | 7.3 | —   | 37.3 | 5.8 | 16.4 | 1000 | 20 |
| 18 | 28 | 7.4 | —   | —   | —   | 33.3 | 6.6 | 16.4 | 1020 | 23 |
| 19 | 29 | —   | 5.0 | —   | —   | 34.3 | 6.1 | 16.5 | 1020 | 25 |
| 20 | 27 | —   | —   | 10  | —   | 32.4 | 5.8 | 16.6 | 1010 | 25 |
| 21 | 28 | —   | —   | —   | 9.0 | 32.8 | 6.2 | 16.4 | 1000 | 24 |
| 22 | 29 | 2.3 | 3.5 | —   | —   | 34.0 | 6.2 | 16.5 | 1010 | 24 |
| 23 | 28 | 2.2 | —   | 7.0 | —   | 32.7 | 5.9 | 16.5 | 1000 | 25 |
| 24 | 28 | 2.2 | —   | —   | 6.3 | 32.9 | 6.3 | 16.4 | 990  | 23 |
| 25 | 28 | —   | 1.4 | 7.1 | —   | 32.9 | 6.9 | 16.4 | 1050 | 23 |
| 26 | 28 | —   | 1.5 | —   | 6.4 | 33.2 | 6.2 | 16.4 | 1000 | 24 |
| 27 | 27 | —   | —   | 5.0 | 4.5 | 32.6 | 6.1 | 16.4 | 1000 | 24 |
| 28 | 28 | 2.2 | 1.5 | 4.1 | —   | 33.2 | 6.6 | 16.5 | 1020 | 24 |
| 29 | 28 | 2.2 | 1.5 | —   | 3.7 | 33.4 | 6.5 | 16.3 | 1010 | 23 |
| 30 | 28 | 2.2 | —   | 3.0 | 3.6 | 32.8 | 6.6 | 16.4 | 1000 | 24 |

TABLE 3

| Example No. | Ti (wt %) | Ce (wt %) | Y (wt %) | Yb (wt %) | Dy (wt %) | Si (wt %) | Kc (MPa · m½) | Hv (GPa) | σ1000° C. (MPa) | cutting length (km) |
|---|---|---|---|---|---|---|---|---|---|---|
| 31 | 28 | —   | 1.5 | 3.1 | 3.6 | 33.1 | 6.4 | 16.3 | 990  | 23 |
| 32 | 28 | 1.8 | 1.2 | 2.6 | 2.3 | 33.2 | 6.4 | 16.4 | 990  | 24 |
| 33 | 30 | 2.1 | —   | 6.9 | —   | 30.8 | 6.0 | 16.6 | 990  | 28 |
| 34 | 30 | —   | 1.4 | 7.0 | —   | 31.0 | 6.7 | 16.6 | 1100 | 26 |
| 35 | 31 | 2.2 | 3.4 | —   | —   | 32.0 | 6.4 | 16.5 | 1000 | 25 |
| 36 | 30 | 2.2 | —   | —   | 6.2 | 31.0 | 6.4 | 16.5 | 980  | 25 |
| 37 | 37 | 7.0 | —   | —   | —   | 26.4 | 5.6 | 17.3 | 980  | 32 |
| 38 | 38 | —   | 4.7 | —   | —   | 27.2 | 5.5 | 17.4 | 1000 | 33 |
| 39 | 36 | —   | —   | 9.2 | —   | 25.2 | 5.3 | 17.6 | 990  | 33 |
| 40 | 37 | —   | —   | —   | 8.5 | 26.1 | 5.6 | 17.4 | 990  | 33 |
| 41 | 38 | 2.1 | 3.3 | —   | —   | 26.9 | 5.6 | 17.3 | 990  | 32 |
| 42 | 37 | 2.1 | —   | 6.7 | —   | 26.0 | 5.2 | 17.4 | 970  | 33 |
| 43 | 37 | 2.1 | —   | —   | 6.0 | 26.2 | 5.7 | 17.2 | 960  | 30 |
| 44 | 37 | —   | 1.4 | 6.7 | —   | 26.2 | 5.8 | 17.3 | 1060 | 32 |
| 45 | 37 | —   | 1.4 | —   | 6.0 | 26.4 | 5.7 | 17.2 | 980  | 32 |

TABLE 4

| Example No. | Ti (wt %) | Ce (wt %) | Y (wt %) | Yb (wt %) | Dy (wt %) | Si (wt %) | Kc (MPa·m½) | Hv (GPa) | σ1000° C. (MPa) | cutting length (km) |
|---|---|---|---|---|---|---|---|---|---|---|
| 46 | 37 | — | — | 4.8 | 4.2 | 25.9 | 5.5 | 17.3 | 960 | 31 |
| 47 | 37 | 2.1 | 1.4 | 3.9 | — | 26.4 | 5.6 | 17.4 | 1010 | 33 |
| 48 | 37 | 2.1 | 1.4 | — | 3.5 | 26.5 | 5.0 | 17.2 | 1000 | 31 |
| 49 | 37 | 2.1 | — | 2.9 | 3.4 | 26.1 | 5.4 | 17.3 | 990 | 33 |
| 50 | 37 | — | 1.4 | 2.9 | 3.4 | 26.3 | 5.3 | 17.2 | 980 | 34 |
| 51 | 37 | 1.7 | 1.2 | 2.4 | 2.2 | 26.3 | 5.2 | 17.3 | 990 | 33 |
| 52 | 38 | 2.0 | — | 6.6 | — | 24.8 | 4.9 | 17.4 | 960 | 35 |
| 53 | 45 | 6.7 | — | — | — | 20.5 | 4.6 | 18.2 | 860 | 59 |
| 54 | 47 | — | 4.5 | — | — | 21.1 | 4.3 | 18.4 | 860 | 60 |
| 55 | 43 | — | — | 9.0 | — | 20.1 | 4.7 | 18.3 | 860 | 60 |
| 56 | 45 | — | — | — | 8.1 | 20.3 | 4.6 | 18.3 | 850 | 59 |
| 57 | 46 | 2.0 | 3.1 | — | — | 20.9 | 4.8 | 18.3 | 850 | 59 |
| 58 | 45 | 2.0 | — | 6.4 | — | 20.2 | 4.4 | 18.4 | 850 | 61 |
| 59 | 45 | 2.0 | — | — | 5.7 | 20.3 | 4.9 | 18.2 | 830 | 58 |
| 60 | 45 | — | 1.3 | 6.4 | — | 20.4 | 5.0 | 18.3 | 880 | 60 |

TABLE 5

| Example No. | Ti (wt %) | Ce (wt %) | Y (wt %) | Yb (wt %) | Dy (wt %) | Al (wt %) | Si (wt %) | Kc (MPa·m½) | Hv (GPa) | σ1000° C. (MPa) | cutting length (km) |
|---|---|---|---|---|---|---|---|---|---|---|---|
| 61 | 45 | — | 1.3 | — | 5.8 | — | 20.5 | 4.9 | 18.2 | 840 | 58 |
| 62 | 45 | — | — | 4.5 | 4.0 | — | 20.2 | 4.6 | 18.2 | 840 | 60 |
| 63 | 45 | 2.0 | 1.3 | 3.7 | — | — | 20.5 | 4.7 | 18.3 | 870 | 60 |
| 64 | 46 | 2.0 | 1.3 | — | 3.3 | — | 20.6 | 4.6 | 18.3 | 850 | 59 |
| 65 | 44 | 1.9 | — | 2.7 | 5.5 | — | 20.0 | 4.5 | 18.4 | 850 | 60 |
| 66 | 45 | — | 1.3 | 2.8 | 3.3 | — | 20.4 | 4.3 | 18.5 | 830 | 61 |
| 67 | 45 | 1.7 | 1.1 | 2.3 | 2.1 | — | 20.5 | 4.5 | 18.5 | 820 | 61 |
| 68 | 46 | 2.0 | — | 6.3 | — | — | 19.4 | 4.2 | 17.7 | 820 | 61 |
| 69 | 53 | 1.9 | — | 6.1 | — | — | 14.5 | 4.1 | 18.8 | 810 | 55 |

| Comparative Example No. | Ti (wt %) | Ce (wt %) | Y (wt %) | Yb (wt %) | Dy (wt %) | Al (wt %) | Si (wt %) | Kc (MPa·m½) | Hv (GPa) | σ1000° C. (MPa) | cutting distance (km) |
|---|---|---|---|---|---|---|---|---|---|---|---|
| 1 | 0 | 2.5 | — | 8.1 | — | — | 52.7 | 7.0 | 15.0 | 790 | 5 |
| 2 | 6 | 2.4 | — | 7.9 | — | — | 48.5 | 6.7 | 15.5 | 800 | 10 |
| 3 | 27 | 6.3 | — | 17.6 | — | — | 23.1 | 7.0 | 16.0 | 850 | 9* |
| 4 | 59 | 1.8 | — | 5.8 | — | — | 9.9 | 3.6 | 16.5 | 710 | 7* |
| 5 | 30 | 2.1 | — | 6.9 | — | — | 30.8 | 5.5 | 15.2 | 800 | 10* |
| 6 | 32 | — | — | 6.9 | — | 2.8 | 32.8 | 5.3 | 16.3 | 830 | 17* |

*Chipping has been yielded in each cutting length of Comparative Examples 3–6, thus at that time cutting test has been stopped.

As may be seen from the test results, the test pieces of the embodiments having the composition stated in the claims of the present invention all exhibit excellent cutting performance. For example, the cutting length of 15 km or longer can be realized with a composition containing 10 to 56 wt % of Ti and 11.6 to 51 wt % of Si, while the cutting length of 20 km or longer can be realized with a composition containing 19 to 41 wt % of Ti and 21 to 42.8 wt % of Si, and the cutting length of 40 km or longer can be realized with a composition containing 41 to 56 wt % of Ti and 11.8 to 28.8 wt % of Si. It is also seen that, with increased amount of Ti, not only is the boundary wear resistance of the end cutting edge improved but is the cutting length increased such that the cutting length is 3 to 7 times as long as that of the Ti-free product (Comparative Example 1).

The test piece of Comparative Example 3, in which the amount of the sintering aid departs from the claimed scope, exhibits a cutting performance which is not satisfactory as compared to the value obtained with the tests of the Examples of the invention. On the other hand, if the Ti amount is excessive, toughness proper to silicon nitride is lost, so that the edge is susceptible to chipping and hence the test piece is not suited as a tool (Comparative Example 4). It is also seen that test pieces having a Vickers hardness less than 16 GPa or a bending strength at 1000° C. less than 800 MPa are inferior in wear resistance or resistance against chipping and hence are not sufficient as a cutting tool. Comparison of a test piece of Comparative Example 6 employing $Al_2O_3$ as a sintering aid to test pieces of Examples 33 to 36 each having the amounts of Ti and Si substantially equal thereto reveals that the test pieces of the Examples are superior in bending strength, fracture toughness and cutting performance, despite the fact that the density is of approximately the same value. The test piece of Comparative Example 6 suffered from chipping before the amount of wear of the end cutting edge reaches the service life value, while the test pieces of the Examples were not susceptible to chipping.

Example 2

For several compositions, test pieces employing the HIP method in place of the hot press method were evaluated in the same way as in Example 1. The HIP was carried out under the following conditions: First, the powders were press-molded to a pre-set shape and preliminarily sintered at 1750° C. for two hours in a $N_2$ atmosphere maintained at 1 atm. The resulting product was HIP-processed at 1600° C. for two hours in a $N_2$ atmosphere maintained at 1500 atm. The results are shown in Table 6.

spirit and scope thereof, it is to be understood that the invention is not limited to the specific embodiments thereof except as defined in the appended claims.

Example 4

As a starting material, $\alpha$-$Si_3N_4$ powders with a mean particle size of 0.7 μm and a specific gravity (s.g.) of 3.2,

TABLE 1

| Example No. | Ti (wt %) | Ce (wt %) | Y (wt %) | Yb (wt %) | Dy (wt %) | Si (wt %) | Kc (MPa · m½) | Hv (GPa) | σ1000° C. (MPa) | cutting length (km) |
|---|---|---|---|---|---|---|---|---|---|---|
| 70 | 11 | 2.2 | — | 6.7 | — | 45.3 | 6.3 | 16.0 | 1010 | 13 |
| 71 | 21 | 2.3 | — | 6.3 | — | 37.9 | 5.5 | 16.3 | 1000 | 20 |

The compositions of the test pieces are relatively close to that of Example 1 of Table 1 and to that of Example 17 of Table 2 indicating that the test pieces are equivalent in physical properties and cutting properties to those of these Examples.

Example 3

On the test piece No.33 prepared in Example 1 (Table 3), as a substrate, various coating layers were applied by the CVD method, and cutting performance tests were conducted under the same conditions as those of Example 1. The results are shown in Table 7.

powders of N-rich titanium carbo-nitride $TiC_xN_{1-x}$ (x=0.47) with a mean particle size of 1.2 μm, and powders of sintering aids (powders of $Yb_2O_3$ with a mean particle size of 1.5 μm and s.g. of 9.2, powders of $CeO_2$ with a mean particle size of 1.0 μm and s.g. of 7.1, powders of $Y_2O_3$ with a mean particle size of 1.5 μm and s.g. of 8.8 and powders of $Dy_2O_3$ with a mean particle size of 1.5 μm) and s.g. of 8.2 were used. These powders were weighed out to give a predetermined composition ratio as shown in Table 8 (except for R83), and charged into a silicon nitride pot along with balls of silicon nitride (12 mm in diameter) and ethanol, and subjected to ball milling and pulverization for 24 hours. The resulting slurry was charged into a vacuum drier and, under

TABLE 7

| No. | grain size of coating layer(μm) | cutting length | base material No. | coating layer |
|---|---|---|---|---|
| Examples | | | | |
| 1 | 0.5 | 35 | 33 | TiN(1.5 μm) |
| 2 | 0.4 | 34 | 33 | TiCN(1.4 μm) |
| 3 | 0.5 | 35 | 33 | $Al_2O_3$(0.8 μm)—TiCN(0.2 μm) |
| 4 | 0.5 | 40 | 33 | $Al_2O_3$(1 μm)—TiCN(1.3 μm) |
| 5 | 0.5 | 42 | 33 | $Al_2O_3$(1 μm)—TiCN(1 μm)—$Al_2O_3$(1 μm)—TiCN(1 μm) |
| 6 | 0.4 | 41 | 33 | $Al_2O_3$(1 μm)—TiCN(1.4 μm)—$Al_2O_3$(1.1 μm)—TiCN(1.5 μm) |
| 7 | 0.3 | 42 | 33 | $Al_2O_3$(1 μm)—TiCN(1.5 μm) |
| 8 | 0.5 | 39 | 33 | AlON(1 μm)—TiCN(1 μm) |
| 9 | 0.5 | 40 | 33 | $Al_2O_3$(1 μm)—TiC(1 μm)—TiN(1 μm) |
| 10 | 0.5 | 41 | 33 | AlON(1 μm)—TiC(1 μm)—TiCN(1 μm) |
| Comparative Examples | | | | |
| 1 | 0.4 | 30 | 33 | $Al_2O_3$(0.6 μm)—TiCN(0.1 μm) |
| 2 | 0.8 | initial cutting tool | 33 | $Al_2O_3$(3 μm)—TiCN(5 μm) |
| 3 | 0.5 | 5 km peeling | 33 | $Al_2O_3$(1 μm)—TiCN(7 μm) |
| 4 | 1 | 31 | 33 | $Al_2O_3$(1.1 μm)—TiCN(1 μm) |

It is seen from these results that the test pieces of the Examples having the coating layers satisfying the conditions stated in the claims exhibit the cutting performance further improved over the non-coated test pieces shown in Table 3. On the other hand, the test pieces of the Comparative Examples having the coated layers outside the scope of the present invention are not improved significantly in the cutting performance, or the coating films have peeled off.

As many apparently widely different embodiments of the present invention can be made without departing from the evacuation, heated to a temperature of 70° to 80° C. for drying the powders. The dried powder mix was granulated through a #60 sieve. For comparison, a powder mix using $Al_2O_3$ as a sintering aid was prepared using a C-rich TiCN powder $TiC_xN_{1-x}$ (x=0.58) otherwise essentially in the same manner as above. This is shown as Comparative Example R83 of Table 8.

The powder mixes were sintered to a pre-set shape using a hot-press method. The hot-press method was carried out under the following conditions: First, BN powders diluted with ethanol were applied, as a mold release agent, on the inner surface of a carbon mold. A pre-set amount of the granulated powders were then charged into the mold which was then set in an induction heating furnace with an $N_2$ atmosphere at 0.98 MPa (9.8 atm) and uniaxially pressed under a pressure of 20 MPa (200 kg/cm$^2$), and simultaneously heated at temperatures shown in Table 8 for molding and sintering simultaneously. The density of sintered products thus produced was measured by the Archimedes method and were all dense in structure with a density being not lower than 99.5% of the theoretical density. The TiCN present in the sintered products had a N/(C+N) ratio of 0.53.

From each sintered product, test pieces were prepared as in Example 1 and subjected to testings. The test pieces for evaluating the cutting performance were produced by grinding the sintered product to a tool shape, shown in FIG. 1, as prescribed in JIS B4103 as SNGN120408, with a chamfer of 0.1×25°.

The physical properties were measured as in Example 1.

The cutting performance was evaluated under the same conditions as Example 1, provided that the cutting length of workpiece was 150 mm.

The result is shown in Table 8.

TABLE 8

| Example No. | composition (vol %) | | | sintering temperature ° C. | physical properties | | | cutting performance |
|---|---|---|---|---|---|---|---|---|
| | $Si_3N_4$ | TiCN** | sintering aids | | Kc MPa | Hv GPa | σ MPa | km |
| 81 | 85 | 10 | 3.5$Yb_2O_3$—1.5$CeO_2$ | 1850 | 6.5 | 16.1 | 1050 | 15 |
| 82 | 75 | 20 | 3.5$Yb_2O_3$—1.5$CeO_2$ | 1850 | 5.8 | 16.4 | 1000 | 20 |
| 83 | 65 | 30 | 3.5$Yb_2O_3$—1.5$CeO_2$ | 1850 | 6.0 | 16.6 | 990 | 28 |
| 84 | 55 | 40 | 3.5$Yb_2O_3$—1.5$CeO_2$ | 1850 | 4.9 | 17.4 | 960 | 35 |
| 85 | 45 | 50 | 3.5$Yb_2O_3$—1.5$CeO_2$ | 1900 | 4.2 | 16.5 | 950 | 36 |
| 86 | 35 | 60 | 3.5$Yb_2O_3$—1.5$CeO_2$ | 1900 | 4.1 | 16.3 | 900 | 36 |
| 87 | 65 | 30 | 3.5$Yb_2O_3$—1.5$Y_2O_3$ | 1900 | 6.7 | 16.6 | 1100 | 26 |
| 88 | 65 | 30 | 3.5$Y_2O_3$—1.5$CeO_2$ | 1850 | 6.4 | 16.5 | 1000 | 25 |
| 89 | 65 | 30 | 3.5$Dy_2O_3$—1.5$CeO_2$ | 1850 | 6.4 | 16.5 | 980 | 25 |
| R81 | 95 | 0 | 3.5$Yb_2O_3$—1.5$CeO_2$ | 1850 | 7.0 | 15.0 | 790 | 5 |
| R82 | 25 | 70 | 3.5$Yb_2O_3$—1.5$CeO_2$ | 1850 | 3.6 | 16.5 | 710 | 7* |
| R83 | 65 | 30 | 3.5$Yb_2O_3$—1.5$CeO_2$ | 1850 | 5.5 | 15.2 | 800 | 10* |

*Nos. R82 and R83 suffered chipping at the cutting length 7 km and 10 km, respectively, and thus the cutting was ceased at that time.
**TiCN = $TiC_xN_{1-x}$(x = 0.47) for Nos. 81–89 and R82, while x = 0.58 for No. 83.

As can be seen from Table 8, inventive test pieces Nos. 81 to 89 exhibit longer cutting length with increase of TiCN. Namely a cutting length 3 to 7 times of Comparative test piece No. R81 which is free of TiCN was achieved. On the other hand Comparative test piece No. R82 having an excess amount of TiCN suffered chipping before the flank notch (wear) $V_n$ reached 0.1 mm. This is considered to be attributable to the loss of toughness caused by shortage of silicon nitride. Comparative test piece No. R83 containing the C-rich TiCN shows shorter service life than the inventive sintered products. Note, No. R83 had a N/(C+N) ratio about 0.45 of the TiCN in the sintered body.

It should be noted that modifications may be made within the gist and scope of the present invention as herein disclosed and claimed.

What is claimed is:

1. A titanium carbo-nitride complex silicon nitride tool consisting essentially of titanium carbo-nitride and silicon nitride, wherein said tool comprises, based on the total weight of said tool, 10 to 56 wt % of Ti, 11.6 to 51 wt % of Si and 1 to 21 wt % of at least one element selected from the group consisting of Ce, Y, Yb and Dy.

2. The titanium carbo-nitride complex silicon nitride tool as defined in claim 1 wherein one or two or more of Ce, Y, Yb and Dy are contained in an amount of 3 to 15 wt % in total.

3. The titanium carbo-nitride complex silicon nitride tool as defined in claim 1 having a Vickers hardness at room temperature of 16 GPa or higher and a bending strength at 1000° C. of not lower than 800 MPa.

4. The titanium carbo-nitride complex silicon nitride tool as defined in claim 1 containing 19 to 41 wt % of Ti and 21 to 42.8 wt % of Si.

5. The titanium carbo-nitride complex silicon nitride tool as defined in claim 4 having a Vickers hardness at room temperature of 17 GPa or higher and a bending strength at 1000° C. of not lower than 850 MPa.

6. The titanium carbo-nitride complex silicon nitride tool as defined in claim 1 containing 41 to 56 wt % of Ti and 11.8 to 28.8 wt % of Si.

7. The titanium carbo-nitride complex silicon nitride tool as defined in claim 6 having a Vickers hardness at room temperature of 18 GPa or higher.

8. The titanium carbo-nitride complex silicon nitride tool as defined in claim 1, wherein the tool is coated with a coating layer having a film thickness of 1 to 5 μm, said coating layer being mainly composed of a solid solution of one or two or more of carbide, nitride, carbo-nitride and oxide of Al, and carbide, nitride, carbo-nitride and oxide of Ti, provided that the grain size of constituent grains is not more than 0.5 μm.

9. The titanium carbo-nitride complex silicon nitride tool as defined in claim 1, wherein said Ti is present in an amount of at least 21 wt %.

10. The titanium carbo-nitride complex silicon nitride tool as defined in claim 1, wherein said Ti is present in an amount of at least 41 wt %.

11. The titanium carbo-nitride complex silicon nitride tool as defined in claim 1, wherein said Ti and said Si are present in an amount of at least 48.5 wt %.

12. The titanium carbo-nitride complex silicon nitride tool as defined in claim 1, wherein said Ti and said Si are present in an amount of at least 51 wt %.

13. A sintered article of titanium carbo-nitride complex silicon nitride ceramic produced according to the following steps:

(1) preparing a starting powder mix comprising 10 to 60 vol % of $TiC_xN_{1-x}$ ($0.3 < x \leq 0.5$), 0.5 to 10 vol % of at least one oxide selected from the group consisting of $CeO_2$, $Y_2O_3$, $Yb_2O_3$ and $Dy_2O_3$, and the balance being silicon nitride, and (2) sintering the starting powder mix under application of pressure in an inert or nitrogen containing atmosphere at a temperature of 1500 to 1900° C.

14. A ceramic cutting tool formed of the sintered article as defined in claim 13.

15. The ceramic cutting tool formed of the sintered article as defined in claim 14, which has a coating layer consisting essentially of a solid solution of at least one compound selected from the group consisting of carbides, nitrides, carbo-nitrides and oxides of Al, carbides, nitrides, carbo-nitrides and oxides of Ti, provided that constituent grains of said coating layer have a grain size of not more than 0.5 μm.

16. The ceramic cutting tool formed of the sintered article as defined in claim 15, wherein said coating layer has a thickness of 1 to 5 μm.

17. A titanium carbo-nitride complex silicon nitride tool consisting essentially of titanium carbo-nitride and silicon nitride, wherein said tool comprises, based on the total weight of said tool, 10 to 50 wt % of Ti, 11.6 to 51 wt % of Si and 1 to 21 wt % of at least two elements selected from the group consisting of Ce, Y, Yb and Dy.

18. The titanium carbo-nitride complex silicon nitride tool as defined in claim 17, wherein said at least two elements are each present in an amount of at least 1 wt %.

19. The titanium carbo-nitride complex silicon nitride tool as defined in claim 17, wherein said at least two elements are present in a total amount exceeding 3 wt % and X/(X+Y) is in a range from 0.35 to 0.65, wherein said X is wt % of one element of said at least two elements and said Y is wt % of the other element of said at least two elements.

20. A method for producing titanium carbo-nitride complex silicon nitride ceramic comprising:

preparing a starting powder mix comprising 10 to 60 vol % of $TiC_xN_{1-x}$ ($0.3 < x \leq 0.5$), 0.5 to 10 vol % of at least one oxide selected from the group consisting of $CeO_2$, $Y_2O_3$, $Yb_2O_3$ and $Dy_2O_3$, and the balance being silicon nitride, and sintering the starting powder mix under application of pressure in an inert or nitrogen containing atmosphere at a temperature of 1500 to 1900° C.

21. The method as defined in claim 20, wherein said sintering is carried out by hot pressing (HP) at a temperature of 1850 to 1900° C.

22. The method as defined in claim 20, wherein said sintering is carried out by hot isostatic pressing (HIP) at a temperature of 1500 to 1700° C.

23. The method as defined in claim 22, wherein said HIP is preceded by preliminary sintering at 1550 to 2000° C. in a nitrogen atmosphere.

24. The method as defined in claim 22, wherein said HIP is carried out in an inert gas under a pressure of at least 90 MPa.

25. The method as defined in claim 20, which further comprises a step of further processing the sintered ceramic into a cutting tool.

\* \* \* \* \*